(12) United States Patent
Jin et al.

(10) Patent No.: US 12,259,540 B2
(45) Date of Patent: Mar. 25, 2025

(54) IMAGE ACQUISITION DEVICE AND IMAGE ACQUISITION METHOD

(71) Applicant: Vieworks Co., Ltd., Anyang-si (KR)

(72) Inventors: Mingyu Jin, Seoul (KR); Yu Jung Kang, Anyang-si (KR); Chang Woo Kang, Anyang-si (KR); Kyoung Ryoul Seo, Suwon-si (KR)

(73) Assignee: Vieworks Co., Ltd., Anyang-si (KR)

( * ) Notice: Subject to any disclaimer, the term of this patent is extended or adjusted under 35 U.S.C. 154(b) by 87 days.

(21) Appl. No.: 18/295,524

(22) Filed: Apr. 4, 2023

(65) Prior Publication Data

US 2023/0314785 A1 Oct. 5, 2023

(30) Foreign Application Priority Data

Apr. 5, 2022 (KR) .................. 10-2022-0042246

(51) Int. Cl.
*G02B 21/24* (2006.01)
*G02B 21/26* (2006.01)
*G02B 21/36* (2006.01)

(52) U.S. Cl.
CPC ........... *G02B 21/244* (2013.01); *G02B 21/26* (2013.01); *G02B 21/361* (2013.01); *G02B 21/367* (2013.01)

(58) Field of Classification Search
CPC .... G02B 21/244; G02B 21/26; G02B 21/361; G02B 21/367
See application file for complete search history.

(56) References Cited

U.S. PATENT DOCUMENTS

| 10,958,821 B2 | 3/2021 | Byun et al. |
| 2005/0258335 A1 | 11/2005 | Oshiro et al. |
| 2012/0007977 A1* | 1/2012 | Yamamoto ......... G02B 27/0075 348/79 |

(Continued)

FOREIGN PATENT DOCUMENTS

| JP | 2015-156011 A | 8/2015 |
| KR | 20200047971 A | 5/2020 |

(Continued)

OTHER PUBLICATIONS

Jon Andreassen, "Search Report for EP Application No. EP23166273.5", Sep. 6, 2023, EPO, Germany.

*Primary Examiner* — Sunghyoun Park
(74) *Attorney, Agent, or Firm* — Bridgeway IP Law Group, PLLC; Jihun Kim

(57) ABSTRACT

Provided is an image acquisition device including: a stage on which a slide is mounted; an objective lens disposed to face a sample; a beam split unit separating light from the sample, which is incident through the objective lens into at least two, and delivering the separated lights; at least two image sensor units acquiring an image of the sample from the lights separated by the beam split unit; an image generation unit synthesizing the image acquired from the image sensor unit and generating the synthesized image; and a main control unit controlling operations of the stage or the objective lens, and the image sensor unit and the image generation unit, in which the stage is movable relatively to an optical axis of the objective lens at least in a first direction, and the at least two image sensor units acquire images at different focus positions for the sample.

17 Claims, 16 Drawing Sheets

(56) References Cited

U.S. PATENT DOCUMENTS

| | | | |
|---|---|---|---|
| 2013/0182096 A1* | 7/2013 | Boccara | G02B 21/16 |
| | | | 348/79 |
| 2014/0252200 A1* | 9/2014 | Garsha | G01N 21/6458 |
| | | | 250/201.3 |
| 2019/0075247 A1* | 3/2019 | Vink | G06T 5/50 |
| 2021/0090216 A1* | 3/2021 | Matsubara | H04N 23/67 |

FOREIGN PATENT DOCUMENTS

| | | |
|---|---|---|
| WO | 2015107872 A1 | 7/2015 |
| WO | 2019202979 A1 | 10/2019 |
| WO | 2020-012825 A1 | 1/2020 |

\* cited by examiner

IMAGE ACQUISITION DEVICE AND IMAGE ACQUISITION METHOD

CROSS-REFERENCE TO RELATED APPLICATIONS

This application claims priority to and the benefit of Korean Patent Application No. 10-2022-0042246 filed in the Korean Intellectual Property Office on Apr. 5, 2022, the entire contents of which are incorporated herein by reference.

TECHNICAL FIELD

The present invention relates to an image acquisition device and an image acquisition method. More particularly, the present invention relates to an image acquisition device and an image acquisition method capable of acquiring a high depth of field (DOF) image for a sample.

BACKGROUND ART

A depth of field (DOF) refers to a range of a depth in which a focus is clearly captured, and a high DOF image refers to an image in which a range of a depth that is focused is wide. The DOF is determined by a focal distance of the lens, and a lens caliber and a distance between a camera and a subject.

A scan device used in conjunction with a microscope is known. As an example, a slide scanner as a device which automatically scans one or multiple slides to store, and observe and analyze an image is used for acquiring images of tissue samples in various pre-clinical experiments or pathological tests.

It is important to increase the accuracy of an image focus when acquiring a digital slide image by using the slide scanner. In general, tissue samples for acquiring the digital slide image have a thickness of less than 4 µm, and cell samples have dozens of µm thickness.

Here, it is important to increase a subject DOF when shooting the tissue samples or cell samples. However, if the magnification of an objective lens is expanded to 20 to 40 times, the subject DOF of the objective lens is about 1 µm, so there is a problem in that the subject DOF is smaller than the thickness of the tissue sample.

In this case, in order to solve the problem in that the subject DOF of the objective lens is smaller than the thickness of the tissue sample, in the case of the prior art, in order to shoot a subject that is thicker than the subject DOF (e.g., about 1 µm) of the objective lens with respect to one field of view FOV, several images with different focus heights are shot. Next, the most focused parts of each image are processed to be recombined to create one sheet of extended DOF image.

However, the conventional method has a disadvantage that a lot of time is taken because it is necessary to shoot the same area several times to acquire one sheet of high DOF image.

SUMMARY OF THE INVENTION

The present invention has been made in an effort to provide an image acquisition device and an image acquisition method which acquire a plurality of images having different focus positions by using at least one image sensor, and provide a high DOF image by overlapping the plurality of images.

An exemplary embodiment of the present invention provides an image acquisition device including: a stage on which a slide on which a sample is loaded is mounted; an objective lens disposed to face the sample; a beam split unit separating light from the sample, which is incident through the objective lens into at least two, and delivering the separated lights; at least two image sensor units acquiring an image of the sample from the lights separated by the beam split unit; an image generation unit synthesizing the images acquired from the image sensor units and generating the synthesized image; and a main control unit controlling operations of the stage or the objective lens, and the image sensor unit and the image generation unit, in which the stage is movable relatively to an optical axis of the objective lens at least in a first direction, and the at least two image sensor units acquire images at different focus positions for the sample, respectively in one shooting.

In an exemplary embodiment, the main control unit may control the relative movement of the stage in the first direction and a distance of the objective lens to the sample to allow the plurality of image sensor units to acquire a first FOV image for the sample in a first FOV and at a first distance of the objective lens up to the sample, and the plurality of image sensor units to acquire a second FOV image for the sample in a second FOV and at a second distance of the objective lens up to the sample, wherein at least a partial area of the second FOV is overlapped with the first FOV.

The image generation unit may generate the synthesis image by using the first FOV image and the second FOV image.

In an exemplary embodiment, the image generation unit may include an image split unit splits each of the first FOV image and the second FOV image by considering an overlapping area in which the first FOV and the second FOV are overlapped, and generating the split image for each split area, and an image synthesis unit synthesizing the split images and generating the synthesis image.

The image generation unit may evaluate qualities of images at different focus positions in the first FOV image and the second FOV image and calculate an evaluation value, and set the evaluation value as a weight to generate the synthesis image.

In an exemplary embodiment, the image generation unit may include an image preprocessing unit preliminarily synthesizing the split images of the first FOV image for each split area to generate a first preliminary synthesis image, and preliminarily synthesizing the split images of the second FOV image for each split area to generate a second preliminary synthesis image, a buffer temporarily storing the first preliminary synthesis image and the second preliminary synthesis image, and an image postprocessing unit synthesizing the first preliminary synthesis image and the second preliminary synthesis image temporarily stored in the buffer, and generating the synthesis image.

The image preprocessing unit may evaluate the quality of the split image to calculate the evaluation value, and set the evaluation value of the split image as the weight to generate the first preliminary synthesis image or the second preliminary synthesis image.

In an exemplary embodiment, the main control unit may control the plurality of image sensor units to acquire a first FOV image for the sample in a first FOV and at a first distance for the sample of the objective lens, and set at least a partial area of the first FOV image as a focus calculation area and evaluate a focus in the focus calculation area, and calculate a second distance for the sample of the objective lens in a second FOV to adjust a location of the objective lens.

In an exemplary embodiment, the image generation unit may evaluate qualities of a plurality of images at different focus positions in the same FOV for the sample, and calculate the evaluation value, and set the evaluation value as the weight to generate the synthesis image.

In an exemplary embodiment, the image generation unit may generate a high DOF image by the synthesis image, and a frequency filter or a convolution filter may be applied to generate the high DOF image.

Another exemplary embodiment of the present invention provides an image acquisition device including: a stage on which a slide on which a sample is loaded is mounted; an objective lens disposed to face the sample; at least one image sensor unit acquiring an image of the sample through the objective lens; an image generation unit synthesizing a plurality of images having different focus positions, which are acquired from the image sensor unit to generate the high DOF image; and a control unit controlling the stage to move relatively to an optical axis of the objective lens in a first direction, and controlling the image sensor unit to acquire a first FOV image and a second FOV image at different focus positions in a first FOV and a second FOV of which at least partial area is overlapped.

In an exemplary embodiment, the image generation unit may split the first FOV image and the second FOV image by considering the overlapping area in which the first FOV and the second FOV are overlapped, and generate a split image for each split area, and generate the high DOF image for the overlapping area by using the split image which belongs to the overlapping area.

Still another exemplary embodiment of the present invention provides an image acquisition method including: an image acquisition step of acquiring, by at least one image sensor unit, a plurality of images for a plurality of focus positions with respect to a sample of a slide mounted on a stage; and an image synthesis step of synthesizing, by an image generation unit, the plurality of images to generate a synthesis image.

In an exemplary embodiment, the image sensor unit may be provided in plural, and the image acquisition step may be performed by the plurality of image sensor units acquiring images at different focus positions for the sample with respect to the same FOV.

In an exemplary embodiment, the image acquisition step may be performed by acquiring a first FOV image in a first FOV by the image sensor unit, and acquiring a second FOV image at a focus position different from the focus position of the first FOV by the image sensor unit with a second FOV of which at least a partial area is overlapped with the first FOV.

The image synthesis step may include splitting the first FOV image and the second FOV image by considering an overlapping area of the first FOV and the second FOV for each split area, and generating the split image, and generating the synthesis image for the overlapping area by using the split image.

In the image synthesis step, a quality of the split image may be evaluated to calculate an evaluation value, and the evaluation value of the split image may be set as a weight to generate the synthesis image.

In an exemplary embodiment, the image acquisition step may be performed by the plurality of image sensor units having different focal distances with respect to one FOV, and the image synthesis step may include preliminarily synthesizing the split images of the first FOV image for each split area to generate a first preliminary synthesis image, and preliminarily synthesizing the split images of the second FOV image for each split area to generate a second preliminary synthesis image, and synthesizing the first preliminary synthesis image and the second preliminary synthesis image, and generating the synthesis image.

In the image synthesis step, qualities of a plurality of images at different focus positions in the same FOV for the sample may be evaluated to calculate an evaluation value, and the evaluation value may be set as the weight to generate the synthesis image.

In an exemplary embodiment, the image acquisition method may further include enhancing, by the image generation unit, an image clarity by applying a frequency filter or a convolution filter to the synthesis image.

According to an exemplary embodiment of the present invention, as images having a plurality of DOFs for a sample are acquired in a single shooting to synthesize the images, a scanning speed can be enhanced.

According to an exemplary embodiment of the present invention, images having more DOFs can be acquired in an area where an FOV is overlapped by overlapping the FOV in continuous shooting and changing DOFs, so the quality of image synthesis can be enhanced.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
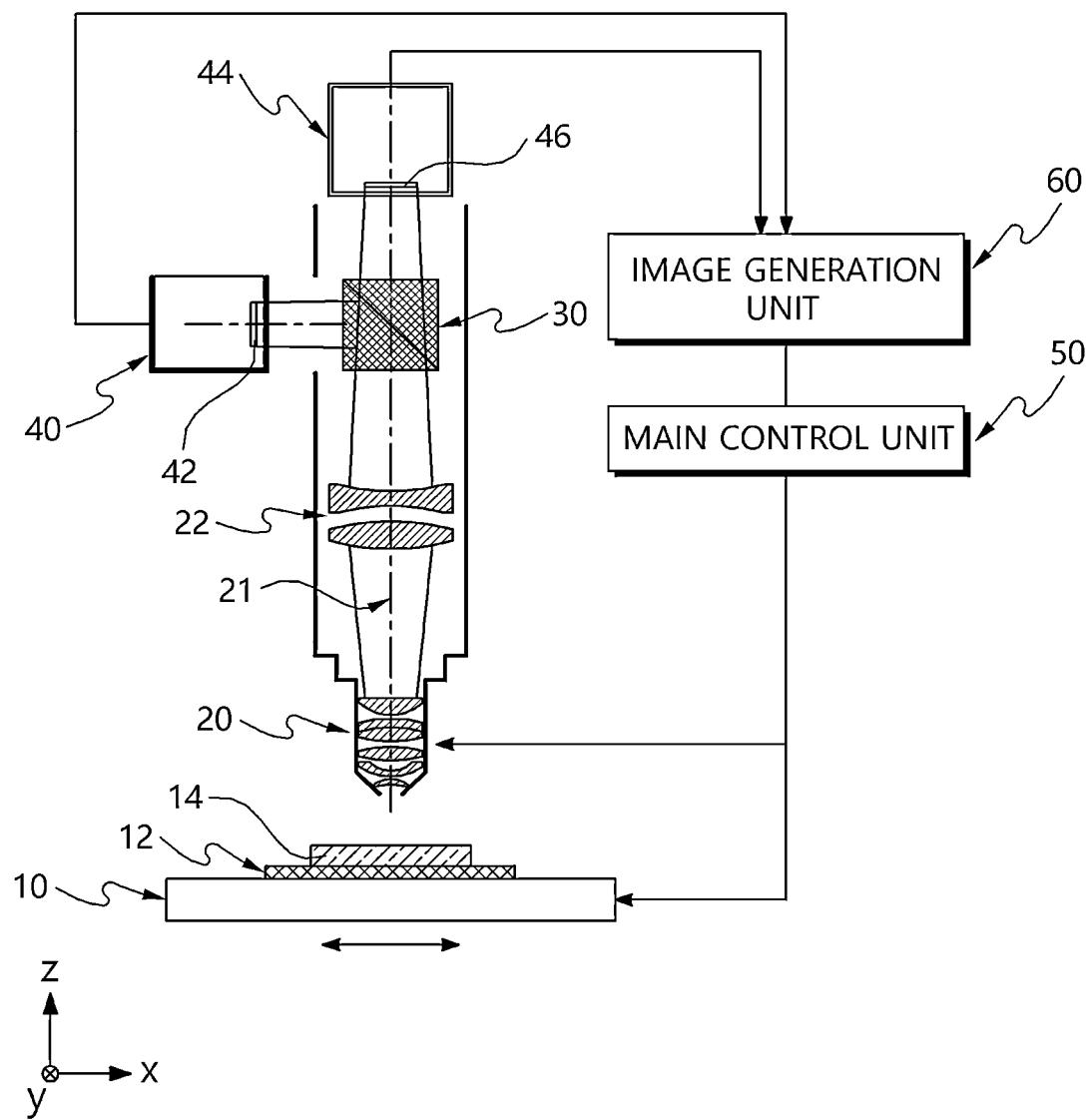
FIG. 1 is a diagram illustrating a configuration of an image acquisition device according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a preferred embodiment of the present invention will be described in detail with reference to the accompanying drawings. First, when reference numerals refer to components of each drawing, it is to be noted that although the same components are illustrated in different drawings, the same components are denoted by the same reference numerals as possible. Further, in describing the present invention, a detailed description of known related configurations and functions may be omitted to avoid unnecessarily obscuring the subject matter of the present invention. Further, hereinafter, the preferred embodiment of the present invention will be described, but the technical spirit of the present invention is not limited thereto or restricted thereby and the embodiments can be modified and variously executed by those skilled in the art.

FIG. 1 is a diagram illustrating a configuration of an image acquisition device according to a first exemplary embodiment of the present invention.

An image acquisition device 1 according to a first exemplary embodiment of the present invention includes a stage 10 on which a slide 12 on which a sample 14 is loaded to be scanned is mounted, lenses 20 and 22 receiving light from the sample 14, a beam split unit 30 separating and outputting light passing through the lenses 20 and 22, a first image sensor unit 40 and a second image sensor unit 44 acquiring images of samples from the light separated from the beam split unit 30, respectively, an image generation unit 60 generating a high DOF image by using the images acquired by the first image sensor unit 40 and the second image sensor unit 44, and a main control unit 50 controlling an entire operation. The lenses 20 and 22 may include an objective lens 20 disposed to face the sample 14 and a tube lens 22 for imaging.

The stage 10 is movable in a first direction (e.g., hereinafter, the first direction is described as an x-axis direction of FIG. 1) by the control of the main control unit 50. However, in the exemplary embodiment of the present invention, the stage 10 is fixed, and may be configured so that the objective lens 20 is moved in the x-axis direction or includes a separate optical structure, and an optical axis 21 is moved. It may be appreciated that the stage 10 and the optical axis 21 for image acquisition are relatively movable in the x-axis direction.

The objective lens 20 is movable in a second direction (e.g., hereinafter, the second direction is described as a z-axis direction of FIG. 1) by the control of the main control unit 50. The focus position in the sample 14 may be varied by the z-axis direction movement of the objective lens 20. In some cases, it may also be possible that the stage 10 is configured to be moved in the z-axis direction and the focus position is varied.

The beam split unit 30 separately provides the light from the sample 14 into the objective lens 20 to the first image sensor unit 40 and the second image sensor unit 44. The beam split unit 30 may be configured as an optical member such as a beam splitter or a prism.

The first image sensor unit 40 and the second image sensor unit 44 may include a first image sensor 42 and a second image sensor 46, respectively, and the first image sensor 42 and the second image sensor 46 may be configured as an imaging device such as a charge coupled device (CCD) or a Complementary Metal-Oxide Semiconductor (CMOS). Further, the first image sensor 42 and the second image sensor 46 may apply any one of a line scan or an area scan scheme.

In the first exemplary embodiment of the present invention, the focus positions for the samples 14 of the first image sensor unit 40 and the second image sensor unit 44 are differently set. That is, the focus positions of the first image sensor unit 40 and the second image sensor unit 44 are differently set with respect to the samples 14, so the image acquired by the first image sensor unit 40 and the image acquired by the second image sensor unit 44 are images at different focus positions in the sample 14.

The image generation unit 60 generates a high DOF image acquired by applying focus stacking to the images acquired by the first image sensor unit 40 and the second image sensor unit 44. In addition, the image generation unit 60 may generate the high DOF image for the sample 14 based on images acquired in a plurality of fields of view (FOV) while the stage 10 sequentially moves in the x-axis direction according to the control of the main control unit 50.

Meanwhile, in the example of FIG. 1, it is exemplified that the stage 10 moves in the x-axis direction, but it is, of course, possible to perform scanning as the stage 10 moves in a horizontal direction (i.e., a y-axis direction which is vertical to the x axis and the z axis) which is vertical to the x axis and moves in the y-axis direction of the stage 10. In addition, scanning on an x-y plane according to the movement in the x-axis direction and the y-axis direction may be possible. However, in the following description, it is exemplified and described that the stage 10 moves in the x-axis direction.

Figure 2:
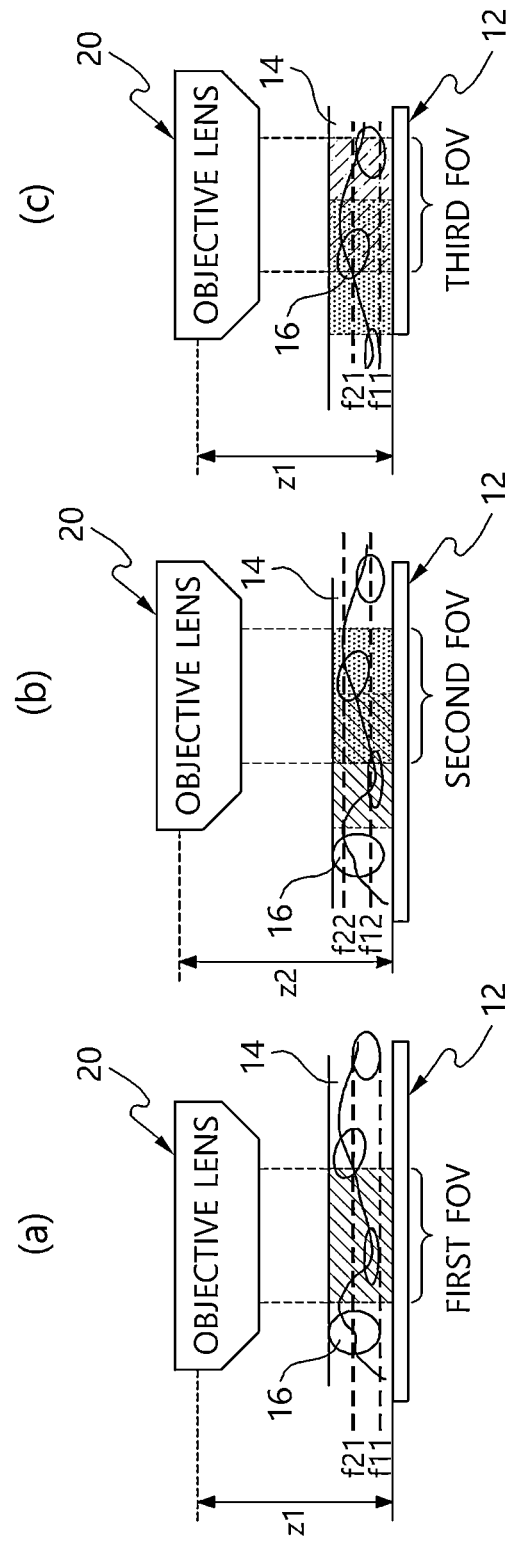
FIG. 2 is a diagram illustrating that a plurality of images at different focus positions are overlapped and acquired in the image acquisition device according to the first exemplary embodiment of the present invention.
Figure 3:
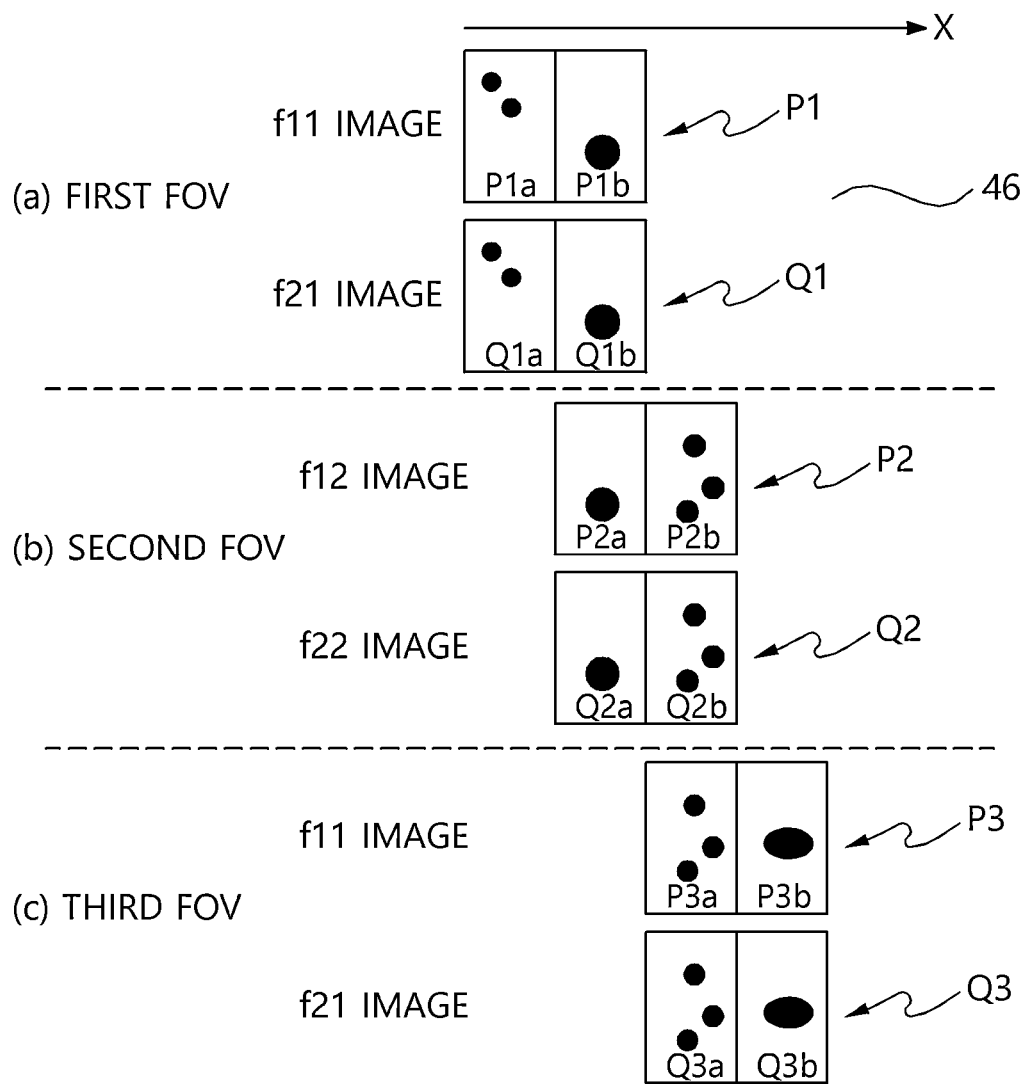
FIG. 3 is a diagram illustrating an example of the image acquired in a state of FIG. 2.

FIG. 2 is a diagram illustrating that a plurality of images at different focus positions are overlapped and acquired in the image acquisition device according to the first exemplary embodiment of the present invention and FIG. 3 is a diagram illustrating an example of the image acquired in a state of FIG. 2.

In each of part (a), part (b), and part (c) of FIG. 2, in a state in which the stage 10 is moved to the left side in the x-axis direction by a predetermined distance, a movement distance is ½ of an FOV size of the image acquired through the objective lens 20. In addition, in part (a) and part (c) of FIG. 2, distance up to the objective lens 20 from the upper surface of the slide 12 is equal as z1, and in part (b) of FIG. 2, the distance up to the objective lens 20 from the upper surface of the slide 12 is z2 different from z1. In part (a) and part (c) of FIG. 2, the focus position in the sample of the image input into the first image sensor unit 40 is f11, and the focus position in the sample of the image input into the second image sensor unit 44 is f21. Meanwhile, in part (b) of FIG. 2, the focus position in the sample of the image input into the first image sensor unit 40 is f12, and the focus position in the sample of the image input into the second image sensor unit 44 is f22. In FIG. 2, reference numeral 16 means a tissue or a cell included in the sample 14.

Referring to part (a) of FIG. 2 and part (a) of FIG. 3, in a first FOV, the first image sensor unit 40 acquires an image P1 according to the focus position f11, and the second image sensor unit 44 acquires an image Q1 according to the focus position f21. Since a part overlapped with an image in subsequent shooting is ½ of the FOV, respective images P1 and Q1 may be split into two split images P1a and P1b, and Q1a and Q1b, respectively.

For reference, in the description or the claims of the present invention, in the first FOV, the images acquired by the image sensor units 40 and 44 may be referred to as a 'first FOV image', and in the second FOV, the images acquired by the image sensor units 40 and 44 may be referred to as a 'second FOV image'. This is also similar even in the case of a third FOV or a fourth FOV.

Referring to part (b) of FIG. 2 and part (b) of FIG. 3, the first image sensor unit 40 and the second image sensor unit 44 acquire the images P2 and Q2 according to the focus position f12 and the focus position f22 in the second FOV. The images P2 and Q2 may be split into two split images P2a and P2b, and Q2a and Q2b, respectively.

In an area where the first FOV and the second FOV are overlapped, four split images P1b, Q1b, P2a, and Q2a having different focus positions are acquired. The image generation unit 60 focus-stacks four split images P1b, Q1b, P2a, and Q2a to generate the high DOF image for the corresponding area. That is, according to the present invention, the image for the sample 14 is acquired while the stage 10 is relatively moved with respect to the optical axis 21 so that the FOVs are overlapped to easily acquire samples images at a plurality of focus positions. As compared with repeatedly adjusting the height of the objective lens 20 while fixing the stage 10, the movement of the stage 10 and the height adjustment of the objective lens 20 are performed in combination with each other, and as a result, a sample image acquisition time at the plurality of focus positions may be shortened. In addition, as illustrated in FIG. 1, as the plurality of image sensor units 40 and 42 are provided, the number of sample images at different focus positions is increased.

By the same scheme, referring to part (c) of FIG. 2 and part (c) of FIG. 3, the first image sensor unit 40 acquires an image P3 and the second image sensor unit 44 acquires an image Q3. The image generation unit 60 focus-stacks the split images P2b, Q2b, P3a, and Q3a to generate a high DOF image for a right area of the second FOV. Further, the image generation unit 60 may generate the high DOF image for the second FOV by adding the high DOF image generated by the split images P1b, Q1b, P2a, and Q2a with respect to the left area of the second FOV and the high DOF image generated by the split images P2b, Q2b, P3a, and Q3a with respect to the right area of the second FOV. When such a process is repeated, a high DOF image for the entire sample 14 or a required part is generated.

Meanwhile, in the exemplary embodiment of the present invention, the distance up to the objective lens 20 from the upper surface of the slide 12 may be a different value other than z1 and z2 in part (c) of FIG. 2, and as a result, the focus positions of the images acquired by the first image sensor unit 40 and the second image sensor unit 44 may also be different.

A distance in which the stage 10 moves in the x-axis direction may also be a different value such as ⅓ or ¼ of the FOV other than ½ of the FOV. When the distance in which the stage 10 moves in the x-axis direction is reduced, the number of overlapped images may be further increased. For example, when the distance in which the stage 10 moves in the x-axis direction is ⅓ of the FOV, and a distance for the sample 14 or the slide 12 of the objective lens 20 is made to be different, and three continuous shootings are made, the image is overlapped three times with respect to a last ⅓ area of the first FOV. When two image sensor units 40 and 44 are provided as illustrated in FIG. 1, six split images having different focus positions are present with respect to the last ⅓ area of the first FOV, so the quality of the high DOF image through the focus stacking may be enhanced.

Figure 4:
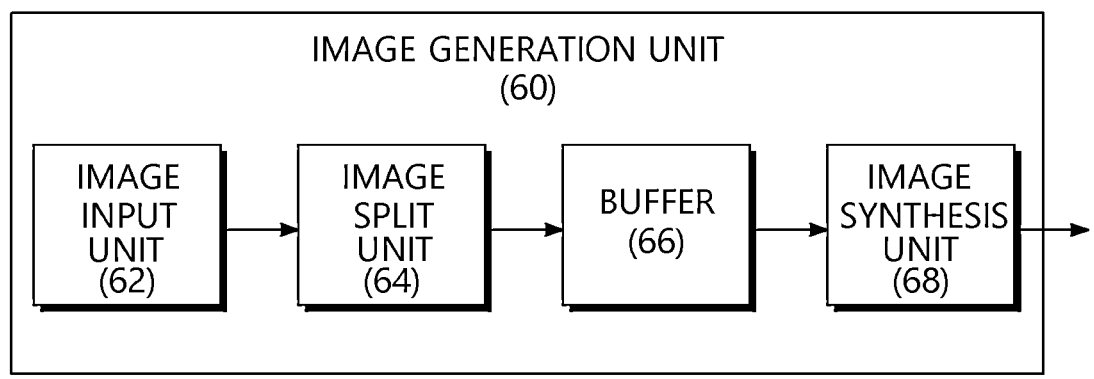
FIG. 4 is a block diagram illustrating a configuration of an image generation unit of the image acquisition device according to the first exemplary embodiment of the present invention.

FIG. 4 is a block diagram illustrating a configuration of an image generation unit of the image acquisition device according to the first exemplary embodiment of the present invention.

The image generation unit 60 may include an image input unit 62, an image split unit 64, a buffer 66, and an image synthesis unit 68.

The image input unit 62 receives the images acquired from the first image sensor unit 40 and the second image sensor unit 44.

The image split unit 64 splits each of the images input from the first image sensor unit 40 and the second image sensor unit 44 by considering the overlapped part of the FOVs in the continuous shooting or the movement distance of the stage 10 and the width of the FOV. In the examples of FIGS. 2 and 3, the image split unit 64 splits each of the images input from the first image sensor unit 40 and the second image sensor unit 44 into two.

The split image split by the image split unit 64 is temporarily stored in the buffer 66. In an exemplary embodiment, the buffer 66 may store the split images acquired by splitting the images input from the first image sensor unit 40 and the second image sensor unit 44 in the order of the FOV.

The image synthesis unit 68 receives split images having a plurality of different focus positions which belong to split areas of the FOV from the buffer 66, and focus-stacks and synthesizes the split images. In an exemplary embodiment, after all split images corresponding to a specific split area of the FOV are stored in the buffer 66, the image synthesis unit 68 may synthesize the split images for the specific split area. In addition, the image synthesis unit 68 may stitch the synthesized images, each of the synthesized image being generated for each split area, and generate a synthesized image for the FOV. The image synthesized by the image synthesis unit 68 may be stored in a separate storage device or output to an external visual display.

Figure 5:
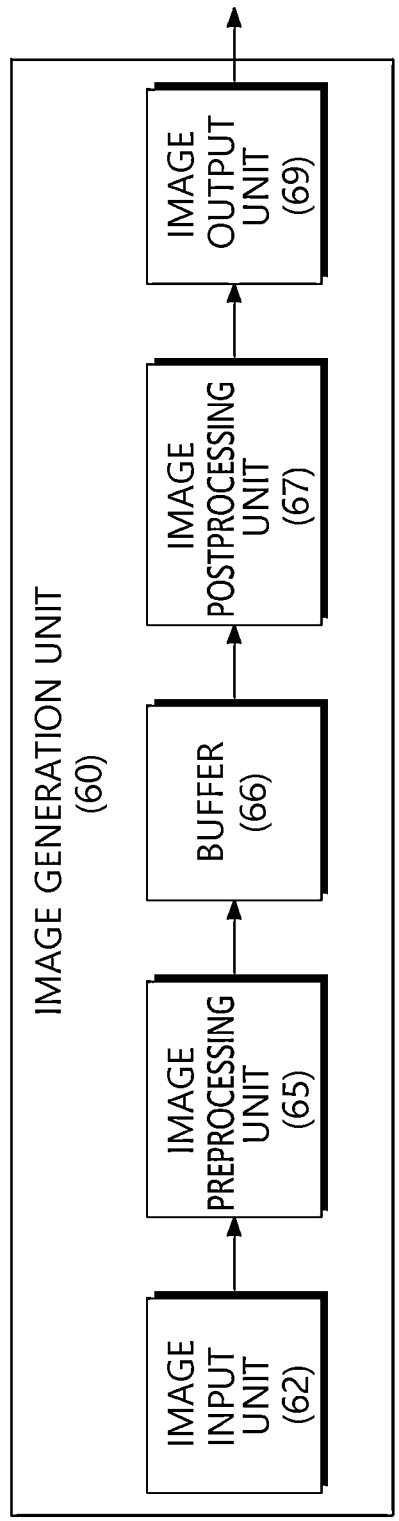
FIG. 5 is a block diagram illustrating another exemplary embodiment of the image generation unit of the image acquisition device according to the first exemplary embodiment of the present invention.
Figure 6:
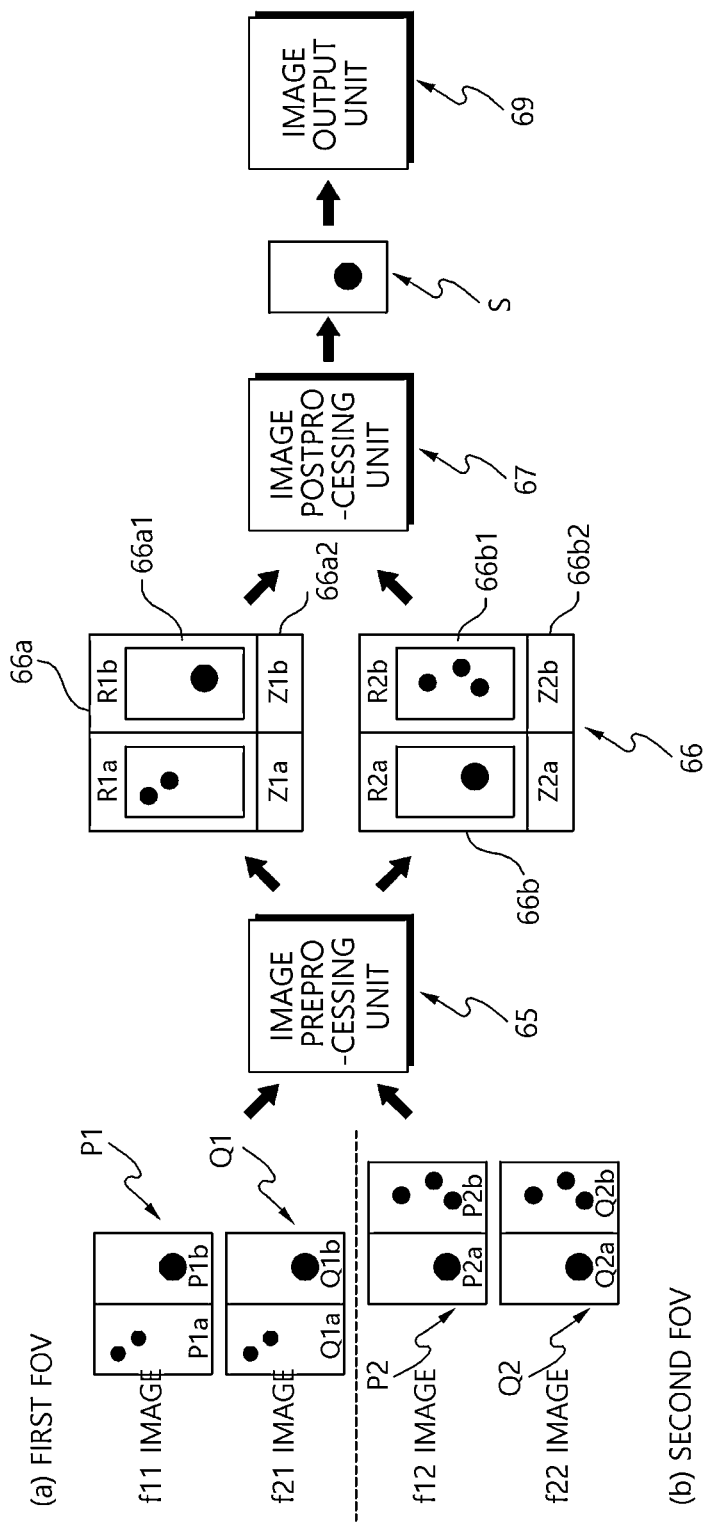
FIG. 6 is a diagram illustrating an image synthesis process in the image generation unit illustrated in FIG. 5.

FIG. 5 is a block diagram illustrating another exemplary embodiment of the image generation unit of the image acquisition device according to the first exemplary embodiment of the present invention, and FIG. 6 is a diagram illustrating an image synthesis process in the image generation unit illustrated in FIG. 5.

A configuration of the image generation unit 60 illustrated in FIG. 5 partially correspond to the configuration of the image generation unit 60 illustrated in FIG. 4. Referring to FIGS. 5 and 6, the image generation unit 60 includes an image input unit 62, an image preprocessing unit 65, a buffer 66, an image postprocessing unit 67, and an image output unit 69.

The image input unit 62 receives the images acquired sequentially according to the movement of the FOV from the first image sensor unit 40 and the second image sensor unit 44.

The image preprocessing unit 65 splits each of the images delivered from the first image sensor unit 40 and the second image sensor unit 44, and generates the corresponding image as the split image, and preliminarily synthesizes the split images for each split area of the FOV. The preliminary synthesized image for the split area of the FOV is stored in the buffer 66.

Referring to FIG. 6, in the first FOV, the image P1 input by the first image sensor unit 40 and the image Q1 input by the second image sensor unit 44 are input into the image preprocessing unit 65. The image preprocessing unit 65 splits the input images P1 and Q1 according to the overlapped area of the continuous FOVs, and generates the split images P1$a$, P1$b$, Q1$a$, and Q1$b$. Thereafter, the image preprocessing unit 65 synthesizes the split images for each split area of the first FOV. In the example, a first preliminary synthesis image R1$a$ in which the split images P1$a$ and Q1$a$ are synthesized and a first preliminary synthesis image R1$b$ in which the split images P1$b$ and Q1$b$ are synthesized are generated and stored in a first buffer 66$a$. That is, the image for the sample for the first FOV is split into two, and two images having different focus positions in respective split images are synthesized into one preliminary synthesis image and stored in the first buffer 66$a$.

Next, in the second FOV, the image P2 acquired by the first image sensor unit 40 and the image Q2 acquired by the second image sensor unit 44 are input into the image preprocessing unit 65. The image preprocessing unit 65 splits the input images P2 and Q2 according to the overlapped area of the continuous FOVs, and generates the split images P2$a$, P2$b$, Q2$a$, and Q2$b$. Thereafter, the image preprocessing unit 65 synthesizes the split images for each split area of the second FOV. In the example, a second preliminary synthesis image R2$a$ in which the split images P2$a$ and Q2$a$ are synthesized and a second preliminary synthesis image R2$b$ in which the split images P2$b$ and Q2$b$ are synthesized are generated and stored in a second buffer 66$b$. That is, the image for the sample for the second FOV is split into two, and two images having different focus positions in respective split images are synthesized into one preliminary synthesis image and stored in the second buffer 66$b$.

The image postprocessing unit 67 generates a high DOF image S by using the first preliminary synthesis image and the second preliminary synthesis image stored in the buffer 66. The generation of the high DOF image S through the synthesis of the split images P1$b$, Q1$b$, P2$a$, and Q2$a$ for the area in which the first FOV and the second FOV are overlapped may be made by synthesizing the first preliminary synthesis image R1$b$ and the second preliminary synthesis image R2$a$ by the image postprocessing unit 67.

The image for the third FOV in FIG. 2 may be stored in the first buffer 66$a$ via the image preprocessing unit 65, and a high DOF image for an area in which the third FOV and the second FOV are overlapped may be generated according to the method described above.

In an exemplary embodiment, the image preprocessing unit 65 may consider an evaluation value of each split image as a weight when synthesizing the split images for the same area. The evaluation value of the split image may be related to whether an image quality or a focus of the image is matched. As an example, as the evaluation value of the split image, Brenner gradient, Tenenbaum gradient, energy laplace, etc., may be used. In addition, the evaluation value of the split image may be calculated for an entire area of each split image or a partial interested area. When the evaluation value is calculated for the entire area of the split image (e.g., an average focus value of the entire area is calculated), an overall clarity may be somewhat decreased, but the uniformity of the quality may be secured. When the evaluation value is calculated for a central portion of the split image, there is a disadvantage that an outer periphery portion which is highly likely to be distorted is disregarded, but a high clarity may be obtained. If a cell nucleus in the sample is an interested area, the cell nucleus is sensed and the evaluation value of the image is calculated around the cell nucleus to obtain an optimal clarity.

For example, when an evaluation value of the split image P1$b$ in FIG. 6 is Z1 and the evaluation value of the split image Q1$b$ is Z2, a result acquired by multiplying a pixel value of each split image by Z1 and Z2 as the weights is added to generate the first preliminary synthesis image R1$b$ in which the split images P1$b$ and Q1$b$ are synthesized. The evaluation value of each split image or evaluation value of the preliminary synthesis image may be stored in image evaluation value storage units 66$a$2 and 66$b$2 of the buffer 66. In addition, it may also be possible that evaluation values Z1$a$, Z1$b$, Z2$a$, and Z2$b$ of the preliminary synthesis image generated after synthesizing the split images for utilization in the image postprocessing unit 67 are calculated and stored again.

The image postprocessing unit 67 may equally apply the scheme used when synthesizing the split images in the image preprocessing unit 65 even in generating the high DOF image S by synthesizing the first preliminary synthesis image and the second preliminary synthesis image.

In an exemplary embodiment, the buffer 66 may be provided by considering the number of overlapping times of the FOV upon one shooting, in other words, by considering a ratio of the width of the FOV in the x-axis direction and a relative movement distance in the x-axis direction of the stage 10 in continuous shootings. In the exemplary embodiment of FIGS. 1 to 6, since the number of overlapping times is "2", the buffer 66 may be configured to adopt two buffers, i.e., the first buffer 66$a$ and the second buffer 66$b$. In addition, the sizes of the first buffer 66$a$ and the second buffer 66$b$ may be set by considering numbers of continuously input split images.

In an exemplary embodiment, it may also be possible that the buffer 66 is implemented as a circular buffer. When the circular buffer is used, and the images input from the first image sensor unit 40 and the second image sensor unit 44 are preprocessed by the image preprocessing unit 65 and sequentially stored with movement of a pointer of the buffer, there is an advantage in that repeated allocation and release of the memory need not be repeated.

Meanwhile, it may be possible that the image postprocessing unit 67 synthesizes the first preliminary synthesis image and the second preliminary synthesis image, and then applies a frequency filter to the synthesized image, in generating the high DOF image S. As an example, the frequency filter may be a high pass filter.

In an exemplary embodiment, the image postprocessing unit 67 synthesizes images having a plurality of focus positions, and then applies Fourier transform to the synthesized images and transforms the corresponding synthesized images into a frequency domain, and deletes a low-frequency component, and then performs inverse Fourier transform to acquire a high-frequency image. Through such a process, a part in which the focus is not matched or a part which is not clear in the image may be removed.

In an exemplary embodiment, it may also be possible that the image postprocessing unit 67 acquires a high-frequency image in which the low-frequency component is removed by applying a convolution filter. It may be advantageous to apply the convolution filter in parallel processing using a graphics processing unit (GPU) or real-time processing using a field programmable gate array (FPGA). The image postprocessing unit 67 generates a low-frequency blurred image by using a convolution type filter, and removes the blurred image from an original image to acquire the high-frequency image which is a difference image. A size of a kernel for convolution may vary depending on a magnification of the objective lens, a pixel pitch of an image sensor, and the type of a scanned sample.

In an exemplary embodiment, the image postprocessing unit 67 generates a primary high DOF image by synthesizing the split images, and then extracts images of various frequency bands by using a plurality of kernels for the primary high DOF image, and synthesizes the high-frequency image which is the difference image by applying the weight to the primary high DOF image to generate a final high DOF image.

Figure 7:
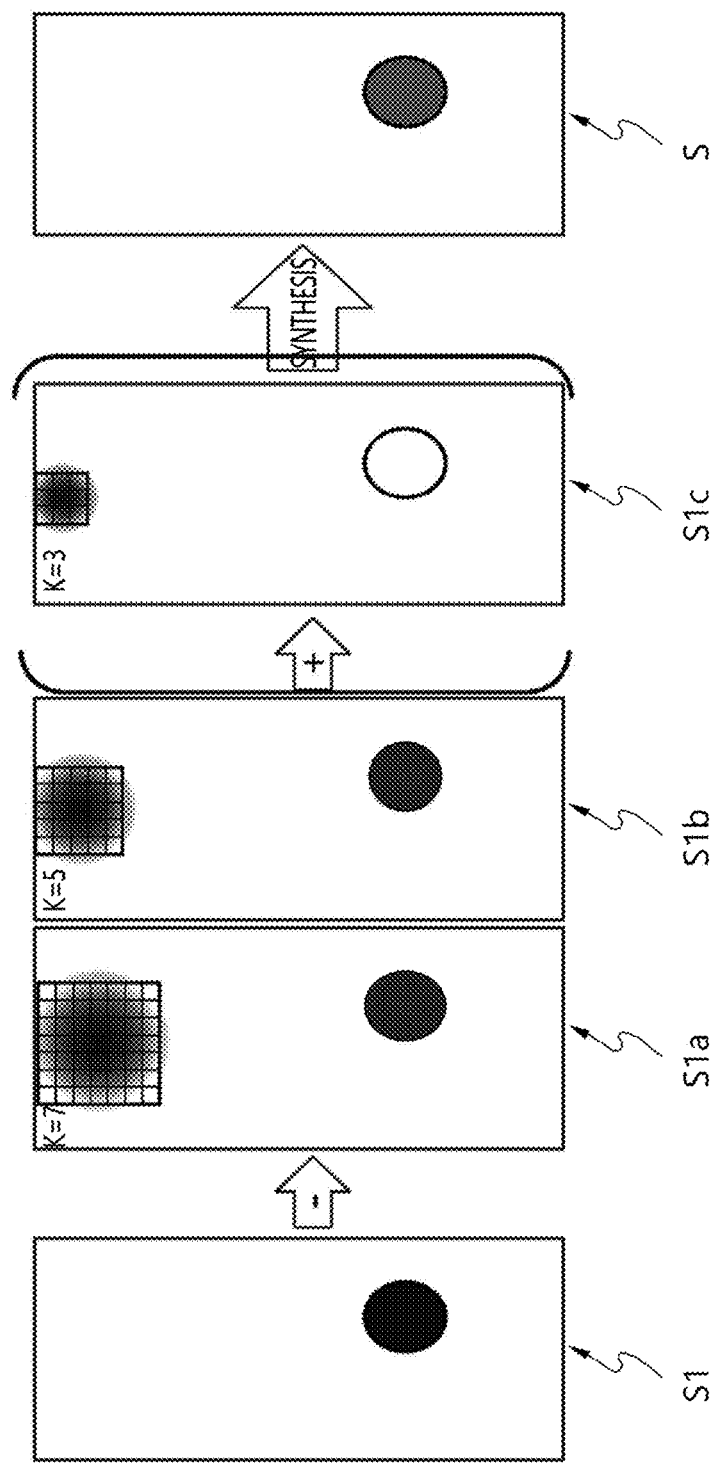
FIG. 7 is a diagram illustrating an example of a processing process of the high DOF image of an image postprocessing unit of the image generation unit of the image acquisition device according to the first exemplary embodiment of the present invention.

FIG. 7 is a diagram illustrating an example of a processing process of the high DOF image of an image postprocessing unit of the image generation unit of the image acquisition device according to the first exemplary embodiment of the present invention.

Referring to FIG. 7, the image postprocessing unit 67 synthesizes the split images to generate a primary high DOF image S1. The image postprocessing unit 67 may generate low-frequency blurred images S1*a* and S1*b* by using at least one kernel, and generate the final high DOF image S by using the difference image acquired by subtracting the blurred images S1*a* and S1*b* from the primary high DOF image. In an exemplary embodiment, the image postprocessing unit 67 applies the weight to the difference image generated by subtracting the blurred images S1*a* and S1*b* from the primary high DOF image S1, and synthesizes the difference image to which the weight is applied with the primary high DOF image S1 to generate the final high DOF image S. Further, the image postprocessing unit 67 additionally synthesizes an auxiliary image S1*c* in which a boundary area in the primary high DOF image S1 is extracted to the primary high DOF image S1 by reducing the size of the kernel to increase the clarity in the synthesis image.

Figure 8:
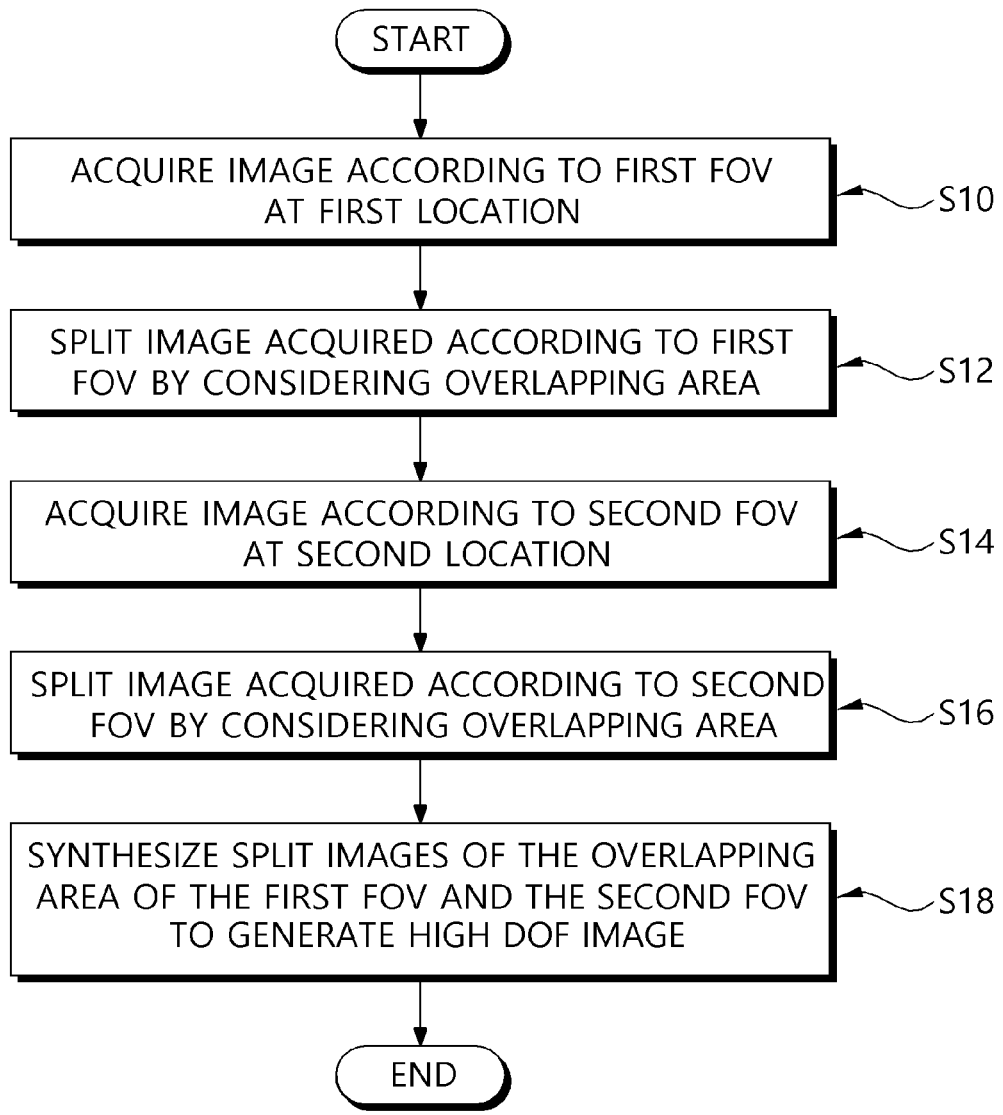
FIG. 8 is a flowchart illustrating an image acquisition method of the image acquisition device according to the first exemplary embodiment of the present invention.
Figure 9:
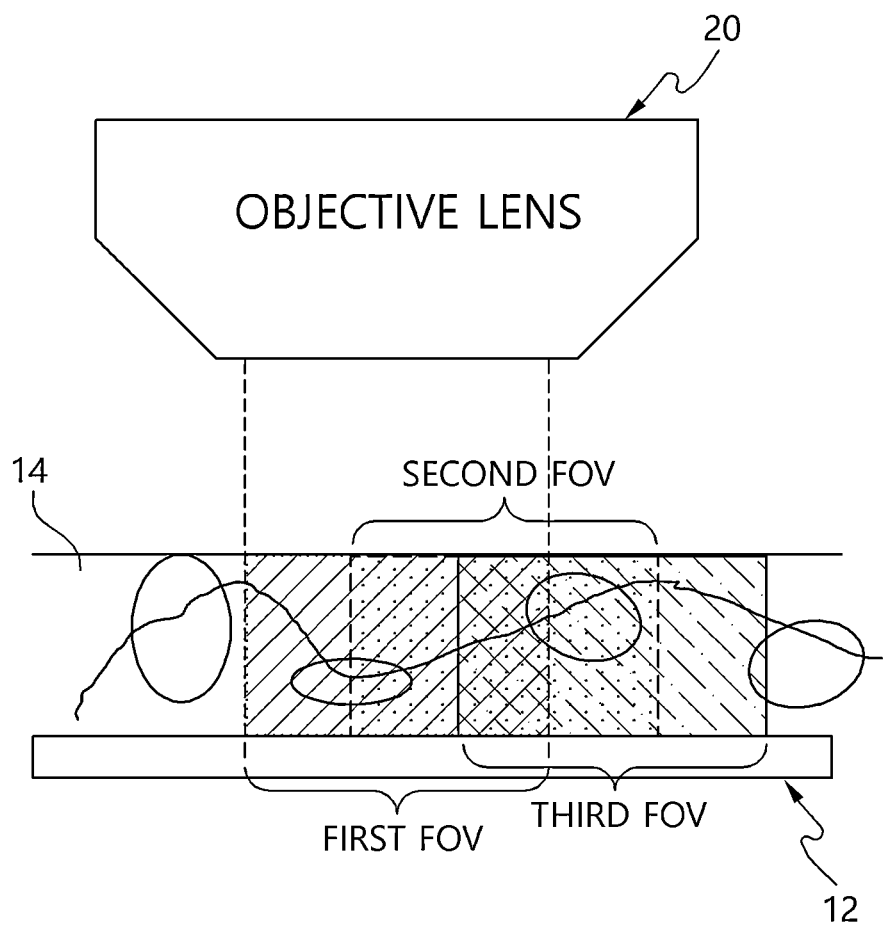
FIG. 9 is a diagram illustrating a case where ⅔ of areas of continuous FOVs are overlapped in the image acquisition device and the image acquisition method according to the first exemplary embodiment of the present invention.

FIG. 8 is a flowchart illustrating an image acquisition method of the image acquisition device according to the first exemplary embodiment of the present invention, and FIG. 9 is a diagram illustrating a case where ⅔ of areas of continuous FOVs are overlapped in the image acquisition device and the image acquisition method according to the first exemplary embodiment of the present invention.

The slide 12 on which the sample is loaded is mounted on the stage 10, and scanning the slide 12 is started.

The image of the sample according to the first FOV of the objective lens 20 at the first location is acquired by the image sensor units 40 and 44 (S10). The first location may be specified as a location on a horizontal plane (the x-axis direction location or the x-axis and y-axis direction locations), and a location in a vertical direction (the z-axis location) of the objective lens 20 with respect to the stage 10 or the slide 12. The image acquired on the objective lens 20 may be separated by the beam split unit 30, and delivered to the first image sensor unit 40 and the second image sensor unit 44. In addition, FOVs of the images acquired by the first image sensor unit 40 and the second image sensor unit 44 may be the same as each other, and the focus positions in the sample may be different from each other.

The image generation unit 60 splits the image acquired according to the first FOV by considering the overlapping area of the continuous FOVs, and stores the split images in the buffer 66 (S12).

The image of the sample according to the second FOV of the objective lens 20 at the second location is acquired by the image sensor units 40 and 44 (S14). The location on the horizontal plane of the objective lens 20 to the stage 10 or the slide 12 at the second location is a location where the second FOV and the first FOV are overlapped at least at a partial area. For example, when the stage 10 moves by ½ of the FOV in the x-axis direction, areas of ½ of the first FOV and the second FOV are overlapped in the x-axis direction. Further, a location (z-axis location) in a vertical direction of the objective lens 20 at the second location and may be set to be different from the z-axis location at the first location, and as a result, the focus positions of the images acquired by the image sensors 40 and 44 in the second FOV are different from that in the first FOV.

The image generation unit 60 splits the images acquired according to the second FOV by considering the overlapping area of the continuous FOVs, and stores the split images in the buffer 66 (S16).

The image generation unit 60 generates the high DOF image by using the split images of the area in which the image acquired according to the first FOV and the image acquired according to the second FOV are overlapped (S18).

In step S12, the image generation unit 60 splits each of the images acquired by the first image sensor unit 40 and the second image sensor unit 44 by considering the overlapping area of the continuous FOVs according to the first FOV. In an exemplary embodiment, the image generation unit 60 synthesizes the split images of the first image sensor unit 40 and the second image sensor unit 44 for each split area to generate a first preliminary synthesis image and store the generated first preliminary synthesis image in the buffer 66.

In step S16, the image generation unit 60 splits each of the images acquired by the first image sensor unit 40 and the second image sensor unit 44 according to the second FOV by considering the overlapping area of the continuous FOVs. In an exemplary embodiment, the image generation unit 60 synthesizes the split images of the first image sensor unit 40 and the second image sensor unit 44 for each split area to generate a second preliminary synthesis image and store the second preliminary synthesis image in the buffer 66.

In step S18, the image generation unit 60 may generate the high DOF image by synthesizing the first preliminary synthesis image and the second preliminary synthesis image for the area where the first FOV and the second FOV are overlapped.

If the slide 12 moves by ⅓ of the FOV in the x-axis direction in continuous scanning, as illustrated in FIG. 9, ⅔ of the areas of the first FOV and the second FOV are overlapped. Further, when a subsequent third FOV is considered, all images shot by the first FOV, the second FOV, and the third FOV are present in an area corresponding to last ⅓ in the x-axis direction of the first FOV. In this case, the image generation unit 60 splits each of the images shot by the first FOV, the second FOV, and the third FOV into three by considering the overlapping area, and generate a high DOF image for the corresponding area by using all split images corresponding to the overlapping area. In FIG. 9, relative heights of the objective lens 20 to the slide 12 or the sample 14 in the first FOV, the second FOV, and the third FOV may be set to be equal to or different from each other. When two image sensor units 40 and 44 are provided as illustrated in FIG. 1, split images having a total of six different focus positions may be present in an area in which all of the first, second, and third FOVs are overlapped.

A plurality of buffers 66 may be provided by considering the size of the overlapping area, and the size of each buffer may be increased or decreased as necessary. When the first FOV and the second FOV are overlapped by ½, the buffer may be individually provided for each of the first FOV and the second FOV (i.e., two buffers are provided). Image information of the subsequent third FOV may be continuously stored in the buffer for the first FOV, and image information of the fourth FOV subsequent to the third FOV may be continuously stored in the buffer for the second FOV. When the continuous FOVs are overlapped by ⅔, the buffers for the first FOV, the second FOV, and the third FOV may be provided, respectively, and a total of three buffers may be provided.

In an exemplary embodiment, the buffer 66 may be provided as the circular buffer.

In step S18, the image generation unit 60 may synthesize the split images having the plurality of focus positions, and then apply the frequency filter.

Steps S10 to S18 may be repeatedly performed, it may also be possible that the image generation unit 60 generates and outputs one high DOF image for a predetermined area or an entire area of the sample by joining the high DOF images generated for each split area.

Figure 10:
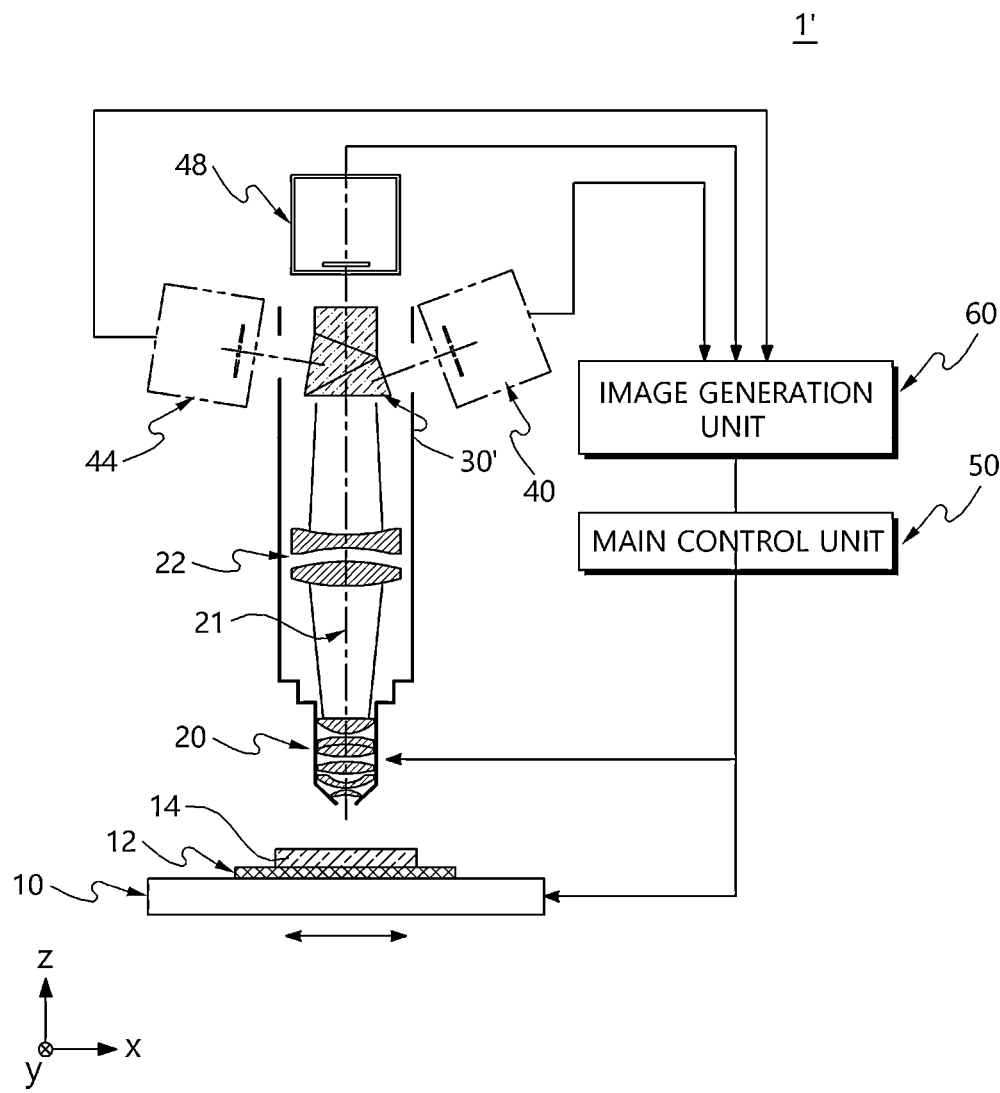
FIG. 10 is a diagram illustrating a configuration of an image acquisition device according to a second exemplary embodiment of the present invention.

FIG. 10 is a diagram illustrating a configuration of an image acquisition device according to a second exemplary embodiment of the present invention.

An image acquisition device 1' according to a second exemplary embodiment of the present invention includes the stage 10 on which the slide 12 is mounted, the objective lens 20, and the tube lens 22 similarly to the configuration of the image acquisition device 1 according to the first exemplary embodiment, and is partially different from the image acquisition device 1 in that the image acquisition device 1' includes a beam split unit 30' and three image sensor units 40, 44, and 48.

The beam split unit 30' splits light from the sample 14 delivered through the objective lens 20 and the tube lens 22 into three. In an exemplary embodiment, the beam split unit 30' may be configured by combining a plurality of prisms. However, in the exemplary embodiment of the present invention, the configuration of the beam split unit 30' may be implemented in various schemes. For example, it is also possible to configure the beam split unit 30' by a scheme of sequentially reflecting and transmitting some of the image through a plurality of dichroic mirror.

The images split by the beam split unit 30' are delivered to the first image sensor unit 40, the second image sensor unit 44, and the third image sensor unit 48. Respective images for the sample 14, which are acquired by the first image sensor unit 40, the second image sensor unit 44, and the third image sensor unit 48 are set to be at different focus positions in the sample 14. As a result, the focus positions of the images in the sample 14, which are acquired by the first image sensor unit 40, the second image sensor unit 44, and the third image sensor unit 48, respectively are different from each other. The images of the sample 14 having different focus positions are delivered to the image generation unit 60.

The image acquired by the image acquisition device 1' according to the second exemplary embodiment is processed as described with reference to FIGS. 2 to 8, so the high DOF image may be generated. That is, the image acquisition device 1 according to the first exemplary embodiment acquires images having two different focus positions in one FOV, and the image acquisition device 1' according to the second exemplary embodiment may acquire images having three different focus positions in one FOV. As a result, the quality of the high DOF image generated by the image generation unit 60 may be enhanced. Further, in the exemplary embodiment of the present invention, it may also be possible that the image is split into four or more by the beam split units 30 and 30', and image sensor units of a number corresponding thereto are provided.

Meanwhile, since the image acquisition device 1' according to the second exemplary embodiment may acquire images of the sample according to three focus positions in one FOV, the image acquisition device 1' may be operated to generate the high DOF image without splitting the image according to the overlapping of the FOVs.

In this case, the image split unit 64 may not be provided in the configuration of the image generation unit 60 illustrated in FIG. 4.

When the images of the sample 14 having the plurality of different focus positions are synthesized as the high DOF image, it may also be possible that the image generation unit 60 evaluates qualities of a plurality of images and calculates evaluation values, and sets the evaluation values as the weights and applies the weights to images for respective focus positions to generate the high DOF image.

The buffer 66 in the image generation unit 60 illustrated in FIG. 4 may not be provided, and the image input into the image input unit 62 may be immediately delivered to the image synthesis unit 68 and the images having the plurality of different focus positions are focus-stacked to generate the synthesis image.

In the image acquisition device 1' according to the second exemplary embodiment, when the sample 14 is continuously scanned, there may be no overlapping area or a minimum overlapping area for stitching may be set in continuous shooting (e.g., in shooting the second FOV after shooting the first FOV). The overlapping area is minimized to enable fast scanning for the sample 14.

Figure 11:
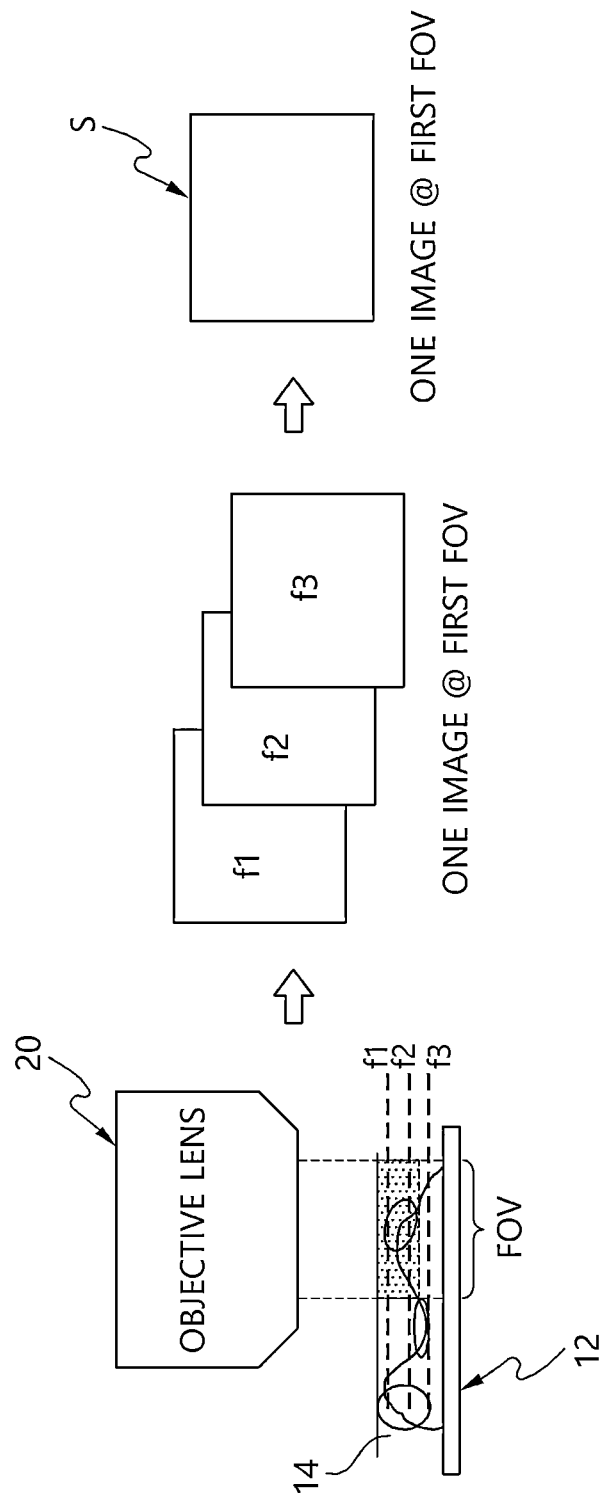
FIG. 11 is a diagram conceptually illustrating a process of generating a high DOF image by using an image acquired by the image acquisition device according to the second exemplary embodiment of the present invention.
Figure 12:
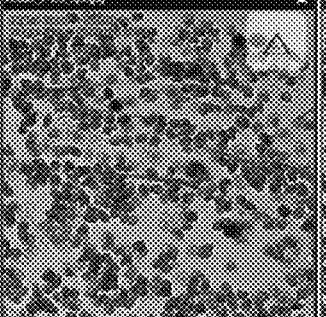
FIG. 12 is a diagram illustrating image samples at different focus positions acquired through the image acquisition device according to the second exemplary embodiment of the present invention.

FIG. 11 is a diagram conceptually illustrating a process of generating a high DOF image by using an image acquired by the image acquisition device according to the second exemplary embodiment of the present invention, and FIG. 12 is a diagram illustrating image samples at different focus positions acquired through the image acquisition device according to the second exemplary embodiment of the present invention.

Referring to FIG. 11, images of the sample 14 which the first image sensor unit 40, the second image sensor unit 44, and the third image sensor unit 48 simultaneously acquire through the objective lens 20 have different focus positions in the same FOV. The first image sensor unit 40, the second image sensor unit 44, and the third image sensor unit 48 may acquire images at focus positions f1, f2, and f3, respectively as illustrated in FIG. 12, and the image generation unit 60 may generate one high DOF image S by using the images having different focus positions in one FOV.

The image generation unit 60 may focus-stack and synthesize the images acquired by the first image sensor unit 40, the second image sensor unit 44, and the third image sensor unit 48, and then apply the frequency filter to the synthesize images, in generating the high DOF image S. As an example, the frequency filter may be a high pass filter. In an exemplary embodiment, the image generation unit 60 synthesizes the images having the plurality of focus positions, and then applies the Fourier transform to the synthesized images and transforms the corresponding images into the frequency domain, and removes the low-frequency component, and then performs the inverse Fourier transform and acquires the high-frequency image to enhance the clarity of the image. In an exemplary embodiment, it may also be possible that the image generation unit 60 acquires the high-frequency image in which the low-frequency component is removed by applying the convolution filter. It may also be possible that the image processing process described by referring to FIG. 7 above is applied as the application of the frequency filter to the image.

Figure 13:
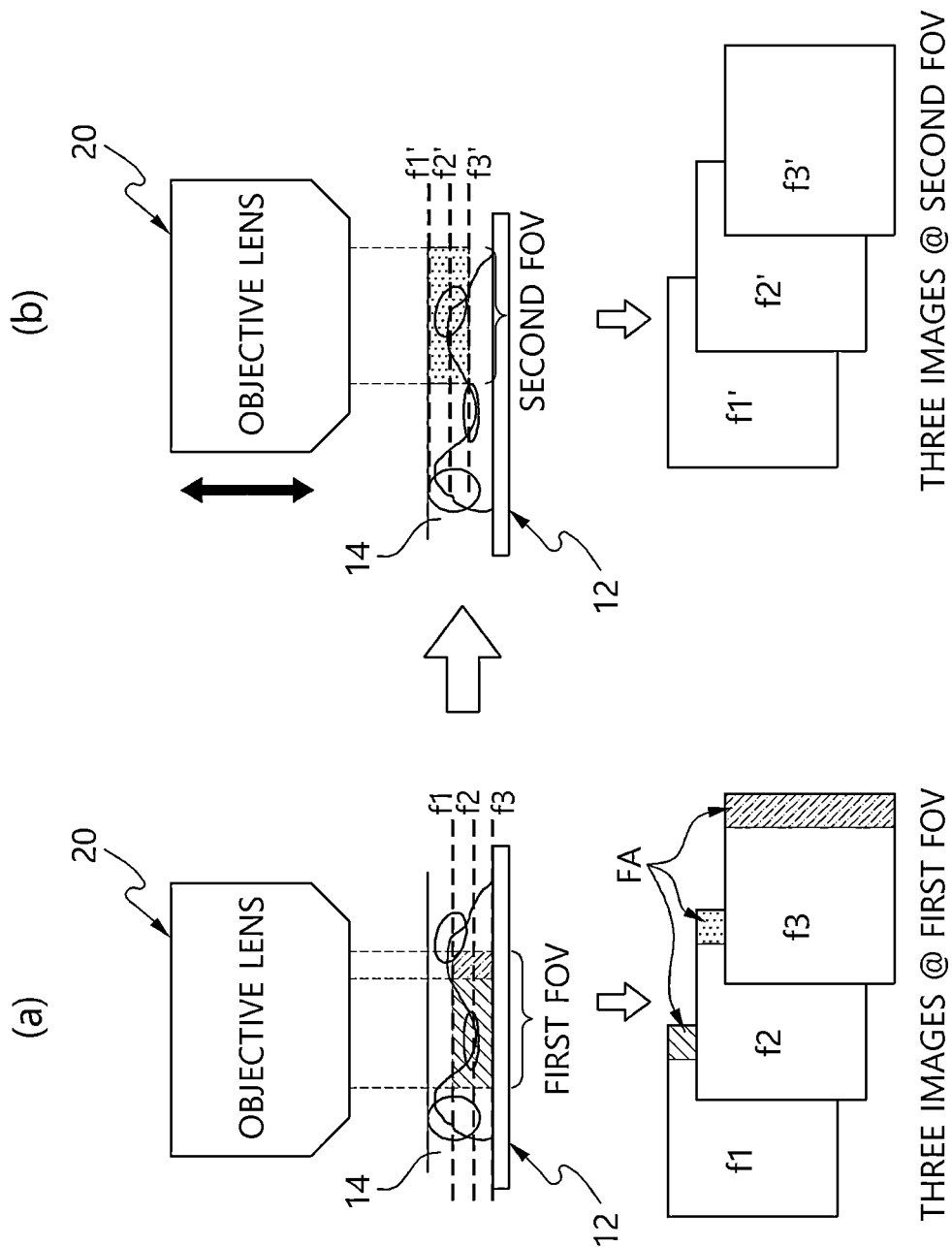
FIG. 13 is a diagram for describing a method for setting a focus in continuous shooting in the image acquisition device according to the second exemplary embodiment of the present invention.

FIG. 13 is a diagram for describing a method for setting a focus in continuous shooting in the image acquisition device according to the second exemplary embodiment of the present invention.

Referring to part (a) of FIG. 13, the plurality of images at the focus positions f1, f2, and f3 in the first FOV are acquired through the first to third image sensor units 40, 44, and 48. A partial area of the continuous second FOV among the images acquired in the first FOV is utilized as a focus calculation area FA. The main control unit 50 evaluates the focus of the image in the focus calculation area FA and calculates the focal distance in the second FOV to adjust the objective lens 20. Referring to part (b) of FIG. 13, a z-axis height of the objective lens 20 is adjusted to acquire images at focus positions f1', f2', and f3' in the second FOV.

In an exemplary embodiment, the second FOV may be a part subsequent to the first FOV or a partial area of the second FOV may be overlapped with the first FOV. When a cell or a tissue which belongs to the focus calculation area FA of the first FOV is to be shot, the second FOV may be configured to include the focus calculation area FA of the first FOV. When this is used, there is an advantage in that it is possible to adjust a focus for shooting the cell or tissue included in the sample 14 without a separate camera or image sensor for focus calculation.

Figure 14:
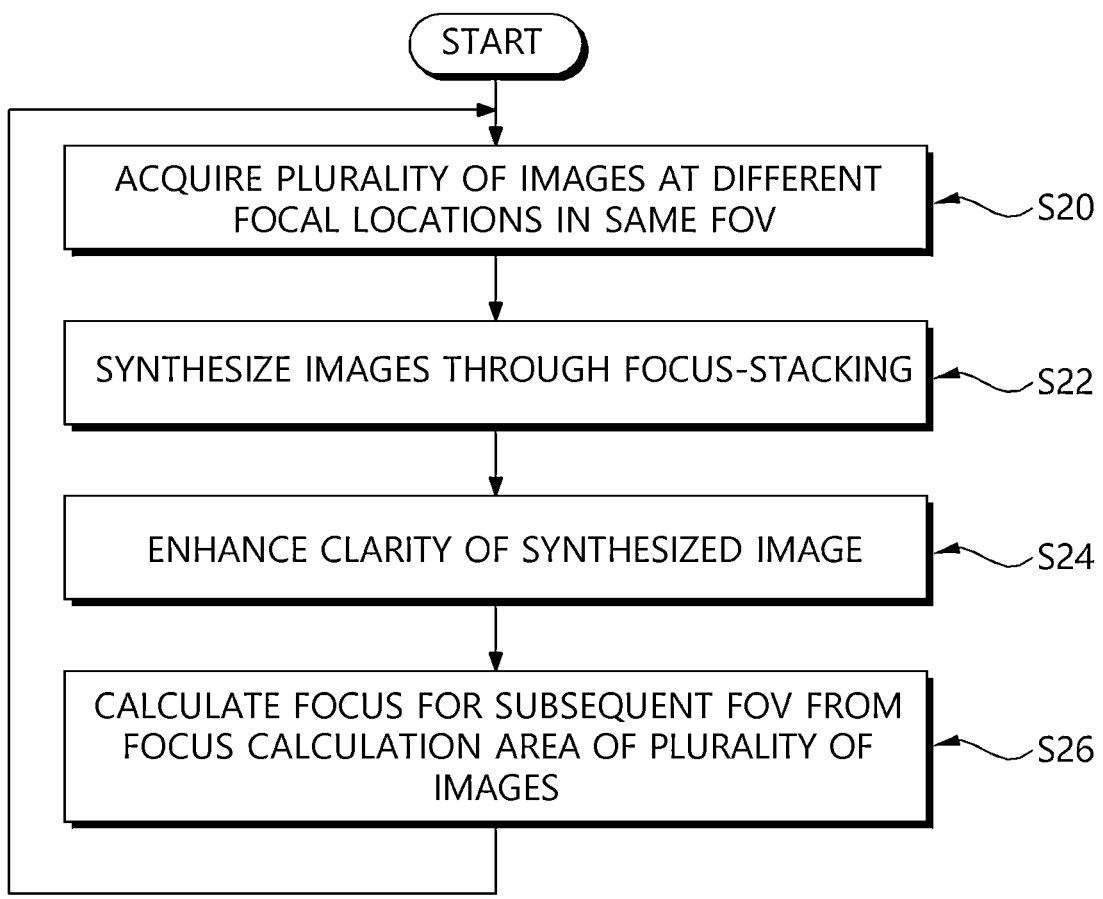
FIG. 14 is a flowchart illustrating an image acquisition method of the image acquisition device according to the second exemplary embodiment of the present invention.

FIG. 14 is a flowchart illustrating an image acquisition method of the image acquisition device according to the second exemplary embodiment of the present invention.

The slide 12 on which the sample 14 is loaded is mounted on the stage 10, and scanning the slide 12 is started.

A plurality of images at different focus positions in the same FOV may be acquired by the image sensor units 40, 44, and 48 (S20). The light from the sample through the objective lens is split into three lights by the beam split unit 30', and delivered to the first to third image sensor units 40, 44, and 48. The first to third image sensor units 40, 44, and 48 acquire images at different focus positions for the sample, and the acquired images are delivered to the image generation unit 60.

The image generation unit 60 synthesizes the plurality of images by applying focus stacking (S22).

The image generation unit 60 enhances the clarity of the synthesized image (S24). In an exemplary embodiment, the image generation unit 60 may generate the high DOF image having the enhanced image clarity by applying the frequency filter or convolution filter to the synthesized image.

For subsequent shooting, the main control unit 50 evaluates image focuses of the focus calculation area FA of the plurality of images acquired in step S20, and calculates a focus for a subsequent FOV (S26).

The main control unit 50 relatively moves the stage 10 on the horizontal plane with respect to the objective lens 20 and changes the focus by moving the objective lens 20 in the vertical direction for the subsequent FOV. Steps S20 to S26 are repeated to acquire the image according to the subsequent FOV.

Figure 15:
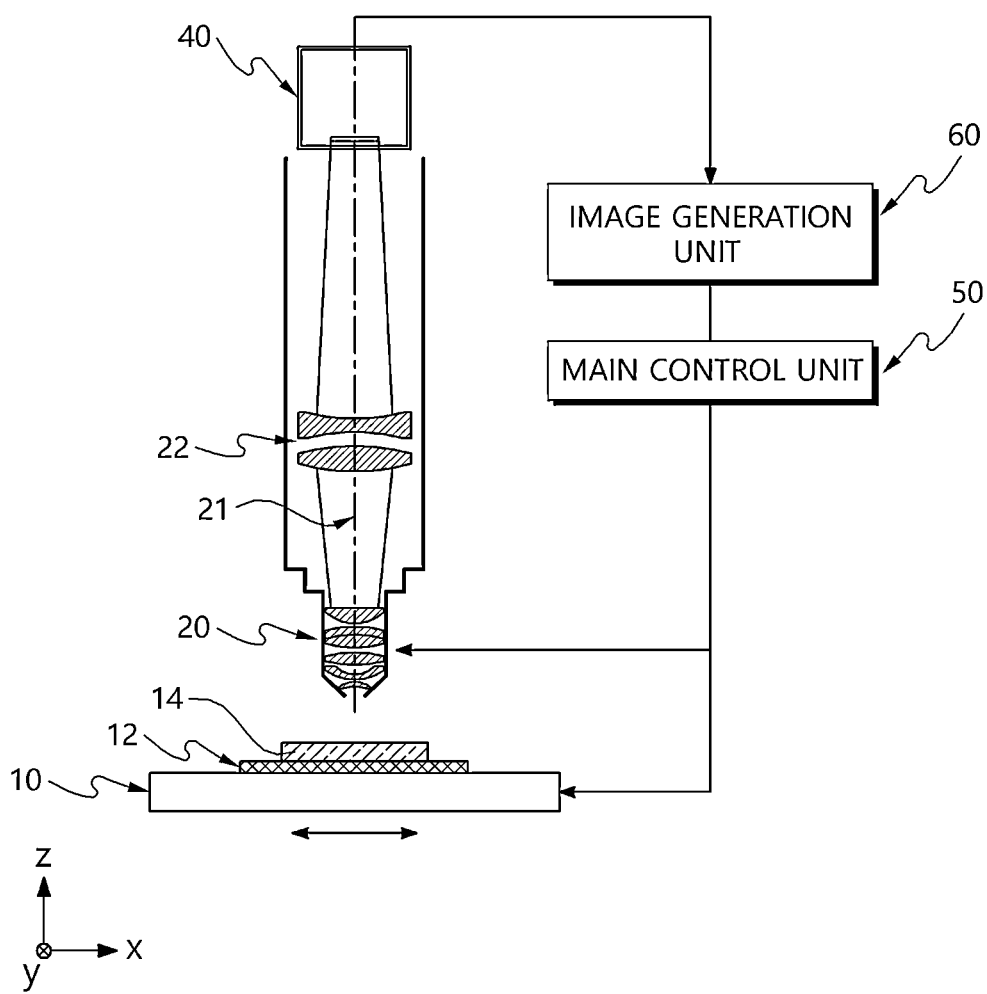
FIG. 15 is a diagram illustrating a configuration of an image acquisition device according to a third exemplary embodiment of the present invention.
Figure 16:
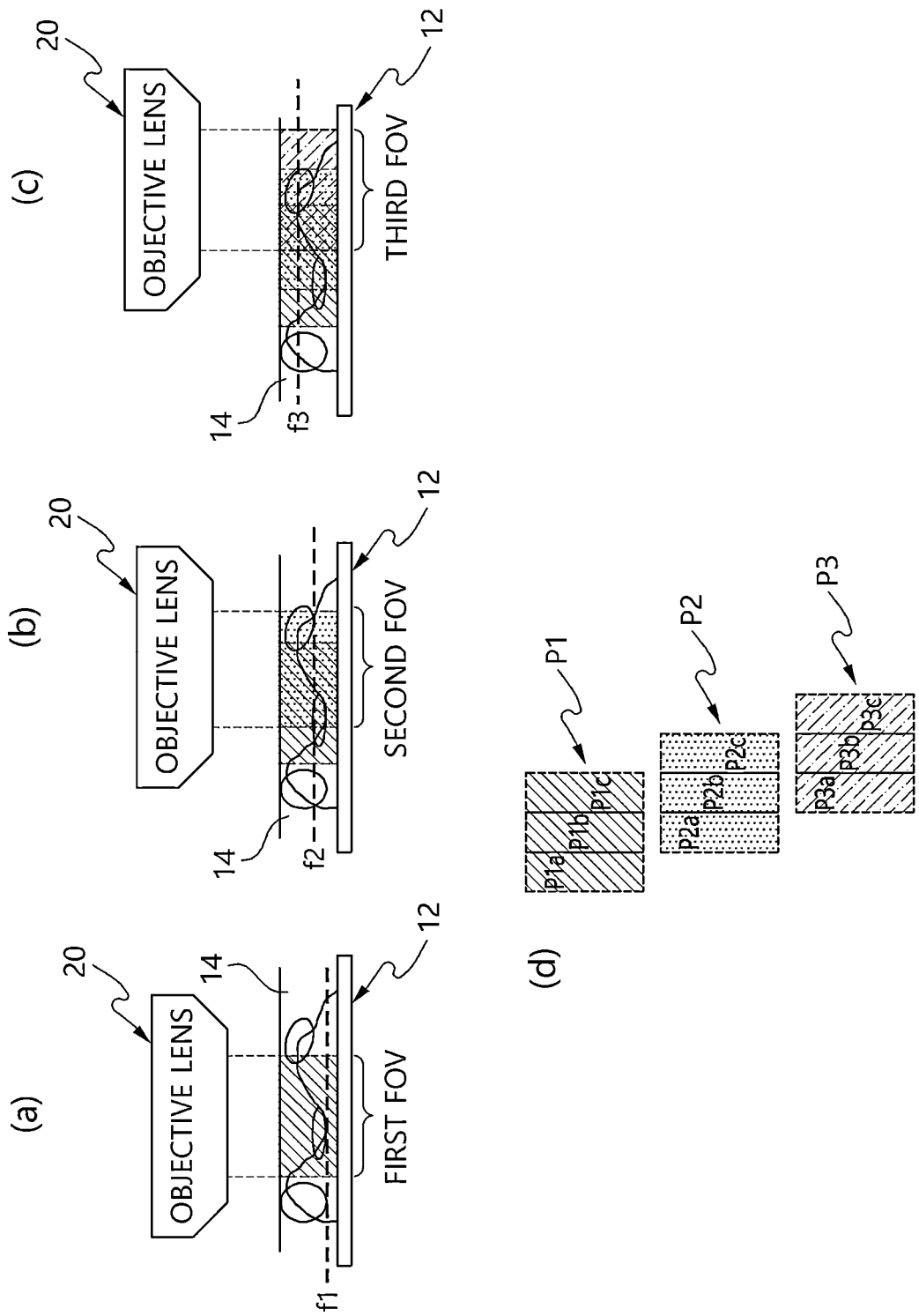
FIG. 16 is a diagram for describing a process of acquiring an image by using an image acquisition device according to a third exemplary embodiment of the present invention.

FIG. 15 is a diagram illustrating a configuration of an image acquisition device according to a third exemplary embodiment of the present invention, and FIG. 16 is a diagram for describing a process of acquiring an image by using an image acquisition device according to a third exemplary embodiment of the present invention.

An image acquisition device 1" according to a third exemplary embodiment of the present invention includes the stage 10 on which the slide 12 is mounted, the objective lens 20, the tube lens 22, the image generation unit 60, and the main control unit 50 similarly to the configuration of the image acquisition device 1 according to the first exemplary embodiment, and is partially different from the image acquisition device 1 in that the image acquisition device 1" does not include a separate beam split unit 30, but includes only one image sensor unit 40.

Referring to FIG. 16, the main control unit 50 moves the stage 10 relatively to the objective lens 20 so that the FOVs are overlapped in continuous shooting, and controls the z-axis direction height of the objective lens 20 so that the focus positions in the sample 14 are different. Part (a) of FIG. 16 illustrates that the image is acquired by setting the focus position as f1 with respect to the first FOV, and part (b) and part (c) of FIG. 16 illustrate that the images of the second FOV and the third FOV are acquired by adjusting the focus positions to be f2 and f3 while moving the stage 10 by ⅓ of an x-axis direction size of the first FOV to the left side in the x-axis direction. As a result, there is an area where the images acquired by the first FOV, the second FOV, and the third FOV are overlapped.

The image generation unit 60 splits the images acquired by the first FOV, the second FOV, and the third FOV by considering the overlapping area of the FOV. Referring to part (d) of FIG. 16, an image P1 of the first FOV is split into three split images P1a, P1b, and P1c, an image P2 of the second FOV is split into three split images P2a, P2b, and P2c, and an image P3 of the third FOV is also split into three split images P3a, P3b, and P3c. The split image P2b and the split image P3a are overlapped and present in a split area corresponding to the third split image P1c of the image P1 of the first FOV.

The image generation unit 60 synthesizes three split images P1c, P2b, and P3a, and applies the frequency filter to generate the high DOF image for the corresponding area. When the high DOF images generated for each split area are connected by repeating such a process, the high DOF image for the entire or interested area of the sample 14 may be generated.

In FIG. 16, it is illustrated that the overlapping area of the continuous FOVs becomes ⅔ of the FOV by moving the stage 10 relatively to the objective lens 20 in the x-axis direction by a size of ⅓ of the FOV, but the relative movement distance of the stage 10 may be variously set to ½, ¼, ⅕, etc., of course. In an exemplary embodiment, the image generation unit 60 may include the buffer 66 by considering the number of split areas of the FOV, and the buffer 66 may be the circular buffer.

In the above description, it is illustrated that sample images according to one to three focus positions are acquired by one to three image sensor units with respect to one FOV, and ½ or ⅔ of the FOV is overlapped in subsequent shooting, and the number of overlapped split images in a specific split area of one FOV is 3, 4, or 6. The number of image sensor units which acquire images at different focus positions with respect to one FOV may be 4 or more, and the number of split images overlapped with the specific split area of the FOV with overlapping of the continuous FOVs may be 2 or more. That is, if the number of overlapping times of the continuous FOVs in one FOV is N (N is a natural number of 1 or more) by M (M is a natural number of 1 or more) image sensor units, the number of split images overlapped in the specific split area becomes M×N. The image generation unit 60 may generate the high DOF image for the specific split area by using M×N split images.

It is primarily described that the high DOF image is generated by using a plurality of images, but when images at different focus positions, which are acquired according to the present invention, it is also possible to generate a 3D image for the sample 14. That is, the image generation unit 60 may generate the 3D image for the sample 14 by using the plurality of images at different focus positions.

In above description, the image acquisition device and the image acquisition method described separately as the first to third exemplary embodiments may also be applied in combination with each other.

The above description just illustrates the technical spirit of the present invention and various changes, modifications, and substitutions can be made by those skilled in the art to which the present invention pertains without departing from an essential characteristic of the present invention. Therefore, the exemplary embodiments and the accompanying drawings disclosed in the present invention are used to not limit but describe the technical spirit of the present invention and the scope of the technical spirit of the present invention is not limited by the exemplary embodiments and the accompanying drawings. The protective scope of the present invention should be construed based on the following claims, and all the technical concepts in the equivalent scope thereof should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An image acquisition device comprising:
    a stage on which a slide to receive a sample is mounted;
    an objective lens disposed to face the sample;
    a beam split unit to separate light from the sample, which is incident through the objective lens into at least two separated lights, and to deliver the at least two separated lights;
    at least two image sensor units to acquire images of the sample from the light separated by the beam split unit;
    an image generation unit to synthesize the images acquired from the at least two image sensor units and generating a synthesized image; and
    a main control unit to control operations of the stage or the objective lens and the at least two image sensor units and the image generation unit,
    wherein the stage is to move relatively to an optical axis of the objective lens at least in a first direction, and the at least two image sensor units acquire the images at different focus positions for the sample, respectively, in one shooting,
    wherein the main control unit is to control a relative movement of the stage in the first direction and a distance of the objective lens to the sample to allow the at least two image sensor units to acquire at least two first field view (FOV) images for the sample in a first FOV at a first distance of the objective lens from the sample in a second direction and at least two second FOV images for the sample in a second FOV at a second distance of the objective lens from the sample in the second direction,
    wherein the first direction is different from the second direction, the second distance is different from the first distance and the second FOV is different from the first FOV,
    wherein the at least two second FOV images are acquired by the at least two image sensor units after the stage is moved a third distance in the first direction from the first FOV to have a partial area of the second FOV overlapped with the first FOV, and
    wherein the image generation unit is to generate the synthesized image based on the partial area of the second FOV overlapped with the first FOV.

2. The image acquisition device of claim 1, wherein the third distance is equal to one half width of the first FOV.

3. The image acquisition device of claim 1, wherein the image generation unit includes
    an image split unit to split each of the at least two first FOV images and the at least two second FOV images by considering an overlapping area in which the first FOV and the second FOV are overlapped, and to generate split images of respective split areas, and
    an image synthesis unit to synthesize the split images and to generate a synthesis image.

4. The image acquisition device of claim 3, wherein the image generation unit to evaluate qualities of images at different focus positions in the at least two first FOV images and the at least two second FOV images, to calculate an evaluation value, and to set the evaluation value as a weight to generate the synthesis image.

5. The image acquisition device of claim 3, wherein the image generation unit includes
an image preprocessing unit to preliminarily synthesize split images of the at least two first FOV images to generate a first preliminary synthesis image, and to preliminarily synthesize split images of the at least two second FOV images to generate a second preliminary synthesis image,
a buffer to temporarily store the first preliminary synthesis image and the second preliminary synthesis image, and
an image postprocessing unit to synthesize the first preliminary synthesis image and the second preliminary synthesis image temporarily stored in the buffer, and to generate the synthesis image.

6. The image acquisition device of claim 5, wherein the image preprocessing unit to evaluate a quality of the split images to calculate an evaluation value, and to set the evaluation value of the split images as a weight to generate the first preliminary synthesis image or the second preliminary synthesis image.

7. The image acquisition device of claim 1, wherein the main control unit is to set at least a partial area of the at least two first FOV images as a focus calculation area, to evaluate a focus in the focus calculation area, and to calculate the second distance for the sample of the objective lens in the second FOV to adjust a location of the objective lens.

8. The image acquisition device of claim 1, wherein the image generation unit is to evaluate qualities of a plurality of images at different focus positions in a same FOV for the sample, to calculate an evaluation value, and to set the evaluation value as a weight to generate the synthesized image.

9. The image acquisition device of claim 1, wherein the image generation unit is to generate a high depth of field (DOF) image by the synthesized image, and a frequency filter or a convolution filter is applied to generate the high DOF image.

10. An image acquisition device comprising:
a stage on which a slide to receive a sample is mounted;
an objective lens disposed to face the sample;
at least two image sensor units to acquire images of the sample through the objective lens;
an image generation unit to synthesize a plurality of images having different focus positions, which are acquired from the at least two image sensor units to generate a high DOF image; and
a control unit to control the stage to move relatively to an optical axis of the objective lens in a first direction, and to control the at least two image sensor units to acquire at least two first field view (FOV) images for the sample in a first FOV at a first distance of the objective lens from the sample in a second direction and at least two second FOV images for the sample in a second FOV at a second distance of the objective lens from the sample in the second direction,
wherein the first direction is different from the second direction, the second distance is different from the first distance and the second FOV is different from the first FOV,
wherein the at least two second FOV images are acquired by the at least two image sensor units after the stage is moved a third distance in the first direction from the first FOV to have a partial area of the second FOV overlapped with the first FOV, and
wherein the image generation unit is to generate a synthesized image based on the partial area of the second FOV overlapped with the first FOV.

11. The image acquisition device of claim 10, wherein the image generation unit splits the at least two first FOV images and the at least two second FOV images by considering the partial area in which the first FOV and the second FOV are overlapped, generates split images of respective split areas, and generates the high DOF image for the partial area by using the split images.

12. An image acquisition method of an image acquisition device, wherein the image acquisition device comprising:
a stage on which a slide to receive a sample is mounted;
an objective lens disposed to face the sample;
at least two image sensor units;
an image generation unit to synthesize a plurality of images having different focus positions, which are acquired from the at least two image sensor units to generate a high DOF image; and
a control unit; and
wherein the method comprising:
acquiring, by the at least two image sensor units, images of the sample through the objective lens;
controlling, by the control unit, the stage to move relatively to an optical axis of the objective lens in a first direction, and the at least two image sensor units to acquire at least two first field view (FOV) images for the sample in a first FOV at a first distance of the objective lens from the sample in a second direction and at least two second FOV images for the sample in a second FOV at a second distance of the objective lens from the sample in the second direction,
wherein the first direction is different from the second direction, the second distance is different from the first distance and the second FOV is different from the first FOV,
wherein the at least two second FOV images are acquired by the at least two image sensor units after the stage is moved a third distance in the first direction from the first FOV to have a partial area of the second FOV overlapped with the first FOV, and
generating, by the image generation unit, a synthesized image based on the partial area of the second FOV overlapped with the first FOV.

13. The image acquisition method of claim 12, wherein the the generating of the synthesized image includes
splitting each of the at least two first FOV images and the at least two second FOV images by considering an overlapping area of the first FOV and the second FOV are overlapped, and generating split images of respective split areas, and
generating the synthesized image for the overlapping area by using the split images.

14. The image acquisition method of claim 12, wherein in the generating of the synthesized image, qualities of split images are evaluated to calculate an evaluation value, and the evaluation value of the split images is set as a weight to generate the synthesized image.

15. The image acquisition method of claim 12, wherein the
generating of the synthesized image includes:
preliminarily synthesizing split images of the at least two first FOV images to generate a first preliminary synthesis image, and preliminarily synthesizing the split images of the at least two second FOV images to generate a second preliminary synthesis image, and synthesizing the first preliminary synthesis image and the second preliminary synthesis image, and generating the synthesized image.

16. The image acquisition method of claim 12, wherein in the generating of the synthesized image, qualities of a plurality of images at different focus positions in a same FOV for the sample are evaluated to calculate an evaluation value, and the evaluation value is set as a weight to generate the synthesized image.

17. The image acquisition method of claim 12, further comprising:
enhancing, by the image generation unit, an image clarity by applying a frequency filter or a convolution filter to the synthesized image.

* * * * *